(12) United States Patent
Sreedharanpillai et al.

(10) Patent No.: US 9,823,407 B2
(45) Date of Patent: Nov. 21, 2017

(54) LIGHTING STRIP, LIGHTING SYSTEM, PANEL SUPPORT ELEMENT AND MODULAR PANEL SYSTEM

(71) Applicant: PHILIPS LIGHTING HOLDING B.V., Eindhoven (NL)

(72) Inventors: Rajesh Sreedharanpillai, Velhoven (NL); Fetze Pijlman, Eindhoven (NL); Hendrikus Hubertus Petrus Gommans, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/652,544

(22) PCT Filed: Dec. 12, 2013

(86) PCT No.: PCT/IB2013/060870
§ 371 (c)(1),
(2) Date: Jun. 16, 2015

(87) PCT Pub. No.: WO2014/097073
PCT Pub. Date: Jun. 26, 2014

(65) Prior Publication Data
US 2015/0316707 A1 Nov. 5, 2015

Related U.S. Application Data

(60) Provisional application No. 61/738,456, filed on Dec. 18, 2012.

(51) Int. Cl.
*F21V 8/00* (2006.01)
*F21S 8/00* (2006.01)

(52) U.S. Cl.
CPC ............. *G02B 6/0046* (2013.01); *F21S 8/03* (2013.01); *G02B 6/0016* (2013.01);
(Continued)

(58) Field of Classification Search
CPC ...... G02B 6/0068; G02B 6/0073; G02B 6/00; G02B 6/0011
See application file for complete search history.

(56) References Cited

U.S. PATENT DOCUMENTS 5,704,703 A * 1/1998 Yamada ................. B60Q 3/004
349/65
5,863,114 A * 1/1999 Nagatani ................... F21V 5/02
362/23.16
(Continued)

FOREIGN PATENT DOCUMENTS

JP 56162859 A 12/1981
JP 2001202815 A 7/2001
(Continued)

*Primary Examiner* — Elmito Breval

(57) ABSTRACT

Disclosed is a lighting strip (100) comprising an optical waveguide (120) extending in a length direction of said strip and having a tapered portion tapering from a thin edge (124) to a thick edge (122) in a width direction of said strip; at least one solid state lighting element (110) incorporated in the optical waveguide and arranged to emit light into the optical waveguide in said length direction; and a light scattering pattern (130) on the thick edge of the tapered portion for redirecting the emitted light to the thin edge of the tapered portion. A lighting system, panel support element (210) and modular panel system (200) including such a lighting strip (100) are also disclosed.

15 Claims, 12 Drawing Sheets

Figure 1:
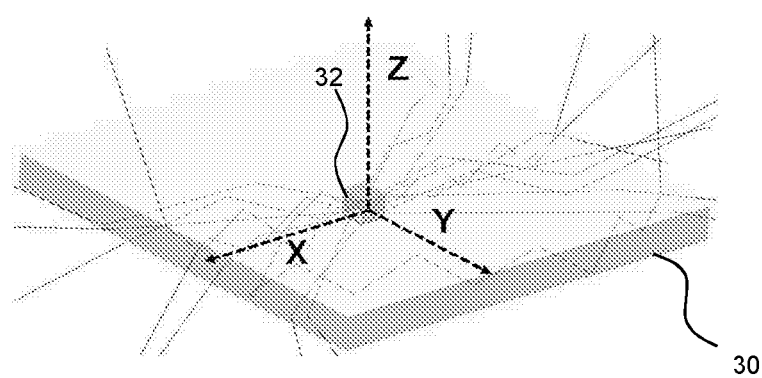

(52) U.S. Cl.
CPC ......... *G02B 6/0021* (2013.01); *G02B 6/0068* (2013.01); *G02B 6/0018* (2013.01)

(56) References Cited

U.S. PATENT DOCUMENTS

| | | | | |
|---|---|---|---|---|
| 6,196,691 | B1* | 3/2001 | Ochiai | G02B 6/0038 349/62 |
| 7,534,013 | B1* | 5/2009 | Simon | F21V 5/046 362/243 |
| 2004/0196667 | A1* | 10/2004 | Lea | G02B 6/0055 362/583 |
| 2007/0006493 | A1* | 1/2007 | Eberwein | B60R 13/10 40/204 |
| 2007/0019439 | A1* | 1/2007 | Yu | G02B 6/0016 362/621 |
| 2008/0123350 | A1* | 5/2008 | Choe | G02B 6/0016 362/331 |
| 2009/0161355 | A1* | 6/2009 | Huang | F21S 6/003 362/231 |
| 2009/0251917 | A1* | 10/2009 | Wollner | B60Q 3/004 362/543 |
| 2009/0310336 | A1* | 12/2009 | Yoon | G02B 6/0018 362/97.1 |
| 2010/0053959 | A1 | 3/2010 | Ijzerman et al. | |
| 2010/0073925 | A1 | 3/2010 | Vissenberg et al. | |
| 2010/0110330 | A1 | 5/2010 | Ajichi et al. | |
| 2011/0085351 | A1 | 4/2011 | Pijlman et al. | |
| 2011/0141715 | A1* | 6/2011 | Uchida | G02B 6/002 362/19 |
| 2011/0199786 | A1* | 8/2011 | Uchida | G02B 6/0026 362/609 |
| 2013/0135896 | A1* | 5/2013 | Kuo | C09K 11/00 362/609 |

FOREIGN PATENT DOCUMENTS

| | | |
|---|---|---|
| JP | 2004079461 A | 3/2004 |
| JP | 2006203511 A | 8/2006 |
| JP | 2007188645 A | 7/2007 |
| JP | 2009283403 A | 12/2009 |
| JP | 2001229703 A | 8/2011 |
| KR | 20030010289 A | 2/2003 |
| WO | 03029722 A1 | 10/2003 |
| WO | 2011001428 A1 | 1/2011 |
| WO | 2011109866 A1 | 9/2011 |
| WO | 2012131636 A2 | 10/2012 |
| WO | WO2012168870 A1 | 12/2012 |

* cited by examiner

LIGHTING STRIP, LIGHTING SYSTEM, PANEL SUPPORT ELEMENT AND MODULAR PANEL SYSTEM

CROSS-REFERENCE TO PRIOR APPLICATIONS

This application is the U.S. National Phase application under 35 U.S.C. §371 of International Application No. PCT/IB13/060870, filed on Dec. 12, 2013, which claims the benefit of U.S. Provisional Patent Application No. 61/738,456, filed on Dec. 18, 2012. These applications are hereby incorporated by reference herein.

FIELD OF THE INVENTION

The present invention relates to a lighting strip.

The present invention further relates to a lighting system comprising such a lighting strip.

The present invention yet further relates to a support element comprising such a lighting strip.

The present invention yet further relates to a modular panel system comprising such a lighting strip.

BACKGROUND OF THE INVENTION

Nowadays, solid state lighting elements such as light emitting diodes (LEDs) find many applications due to their attractive properties such as high light output, low energy consumption and long life. For instance, the high light output allows for large areas to be illuminated by a limited number of solid state lighting elements, especially when the solid state lighting elements are combined with an optical waveguide that distributes the output of the solid state lighting elements over a large area.

Due to the cost of solid state lighting elements, there is an incentive to achieve sufficient lighting levels with a minimal number of solid state lighting elements to make the lighting product commercially attractive. However, this is not a straightforward task, as it is far from trivial to avoid losses from optical elements such as optical waveguides that are necessary to achieve the desired light distribution profile.

Different applications may require different types of light distribution. For instance, in modular panel systems such as a suspended ceiling, it may be desirable to produce light of a highly diffuse nature to avoid glare. On the other hand, in domestic applications such as under-shelf or under-cabinet lighting e.g. in kitchens, libraries or reading rooms, it may be desirable to produce light of a more collimated nature.

WO 2012/131636 by the present applicant discloses a solid state lighting strip for mounting in or on a panel support element of a modular panel system. The strip comprises a plurality of solid state lighting elements, a light extraction layer and a glare reducing layer. The solid state lighting elements are arranged such that the light emitted by said elements is coupled into the glare reducing layer via the light extraction layer. The solid state lighting strip can be used as part of a lighting system, a panel support element and a modular panel system.

This lighting strip is particularly suitable for use with low-power side-emitting solid state lighting elements, e.g. side-emitting LEDs, spaced at regular intervals along the light extraction layer to ensure a homogeneous output by the solid state lighting strip. However, this solution is less suitable to generate a collimated light output using a minimal number of solid state lighting elements, and is therefore for instance less attractive for use in applications where such collimation is desirable, e.g. lighting strips for under-shelf or under-cabinet lighting.

SUMMARY OF THE INVENTION

The present invention seeks to provide a lighting strip in which a reduced number of solid state lighting elements are required to obtain a homogenous and relatively collimated light output.

The present invention further seeks to provide a lighting system comprising such an improved lighting strip.

The present invention yet further seeks to provide a support element comprising such an improved lighting strip.

The present invention still further seeks to provide a modular panel system comprising such an improved lighting strip.

According to an aspect of the present invention, there is provided a lighting strip comprising an optical waveguide extending in a length direction of said strip and having a tapered portion tapering from a thin edge to a thick edge in a width direction of said strip; at least one solid state lighting element incorporated in the optical waveguide and arranged to emit light into the optical waveguide in said length direction; and a light scattering pattern on the thick edge of the tapered portion for redirecting the emitted light to the thin edge of the tapered portion.

This lighting strip benefits from the fact that the combination of a tapered, e.g. wedge-shaped, portion and a suitable light scattering pattern on the thick edge or side wall of the wedge-shaped or tapered portion can be utilized to generate a highly collimated and uniform light output from the thin edge of the lighting strip using a significantly smaller number of solid lighting elements, e.g. LEDs, compared to for instance lighting strips having solid state lighting elements arranged at regular intervals alongside the optical waveguide by ensuring that the one or more solid lighting elements generate light in a length direction of the optical waveguide, i.e. in a direction perpendicular to the width direction of the optical waveguide.

In an embodiment, the lighting strip further comprises a plurality of recesses, each comprising a scattering cavity having opposite exit surfaces in said length direction, wherein each solid state lighting element is placed inside one of said scattering cavities. This has the advantage that high-power top-emitting solid state lighting elements can be used, such that a highly collimated and homogeneous light output can be generated with a minimal number of such lighting elements. Preferably, each solid state element is arranged to emit light towards the scattering cavity in a light emission direction perpendicular to the width direction and the length direction, as is the case with a top-emitting solid state lighting element such as a top-emitting LED.

In an embodiment, the at least one solid state lighting element comprises a white light solid state lighting element at an end of the lighting strip in said length direction to achieve the propagation of the emitted light in the length direction of the lighting strip. To increase light output, the at least one solid state lighting element may comprise a pair of white light solid state lighting elements at opposite ends of the lighting strip in said length direction to achieve the propagation of the emitted light in the length direction of the lighting strip.

It is not necessary to achieve white light. Alternatively, the at least one solid state lighting element comprises a first group of solid state lighting elements, wherein said first group comprises solid state lighting elements emitting different colours.

In an embodiment, said different colours combine to form white light.

In yet another embodiment, the at least one solid state lighting element comprises a first group and a second of solid state lighting elements at opposite ends in said length direction, wherein said each of said first and second group comprises solid state lighting elements emitting different colours In an embodiment, the optical waveguide comprises a pair of said tapered portions arranged such that the thin edges of said pair face each other. This arrangement is particularly advantageous as it obtains a high collimation in the centre of the lighting strip, and sufficiently separates opposing solid state lighting elements such that thermal management of the lighting strip is straightforward.

In an alternative embodiment, the optical waveguide comprises a pair of said tapered portions arranged such that the thick edges of said pair face each other. This arrangement is particularly advantageous if high collimation of the light output of the lighting strip is less important, as this embodiment allows for a more aesthetic appearance of the lighting strip and has the advantage of requiring less printed circuit board area due to the fact that the solid state elements may be packed together more closely in the centre of the lighting strip where the thick edges of the tapered portions face each other.

The lighting strip may further comprise a reflective element covering at least a part of the wave guide such as a specular reflector over an unexposed surface of the waveguide extending in said width direction to further improve the output efficiency of the lighting strip.

The light scattering pattern may comprise a pattern of paint dots, which has the advantage that a suitable redirection pattern can be created at minimal cost.

According to a further aspect of the present invention, there is provided a lighting system including a plurality of lighting strips of the present invention. The lighting system may further comprise a controller for setting the light output of individual lighting strips as a function of at least one of incident daylight, room layout and room occupancy. This allows for the output of the lighting strips to be adapted to localized needs, e.g. in areas such as corridors, office spaces, printing areas and so on, and/or adapted in the presence of an occupant of the room. To this end, the lighting system may further comprise a presence sensor for detecting the presence of an individual in said room, the controller being responsive to the presence sensor.

According to yet another aspect of the present invention there is provided a support element for a modular panel system comprising a lighting strip of the present invention. The lighting strip may be attached to or integrated into the support element.

According to yet another aspect of the present invention there is provided a modular panel system comprising a support grid comprising support members for attaching to a building structure and support elements for extending between support members and a plurality of panels dimensioned to be supported by the support grid, wherein the support grid comprises a plurality of lighting strips of the present invention. The lighting strips preferably are integrated in or attached to the support elements.

Preferably, the ratio between the width of the exit window of the lighting strips and the pitch of the panel support elements in the support grid is chosen in the range of 0.02-0.08 to ensure that the lighting levels in the room comply with glare requirements. More preferably this ratio is chosen to be 0.04.

BRIEF DESCRIPTION OF THE EMBODIMENTS

Figure 2:
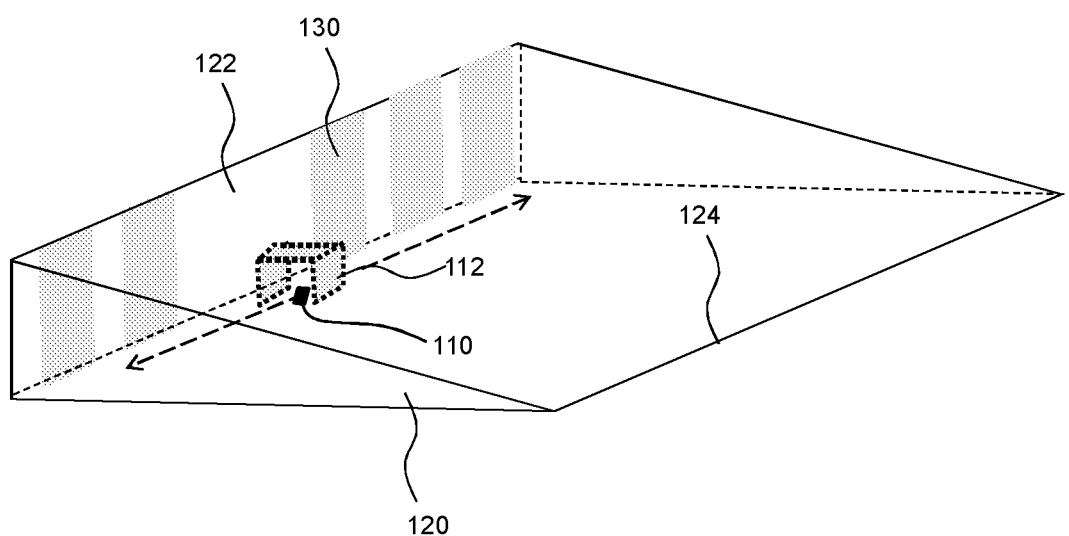
Figure 3:
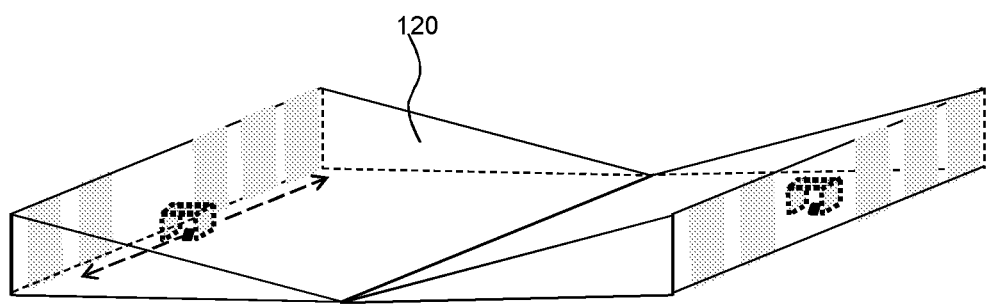
Figure 4:
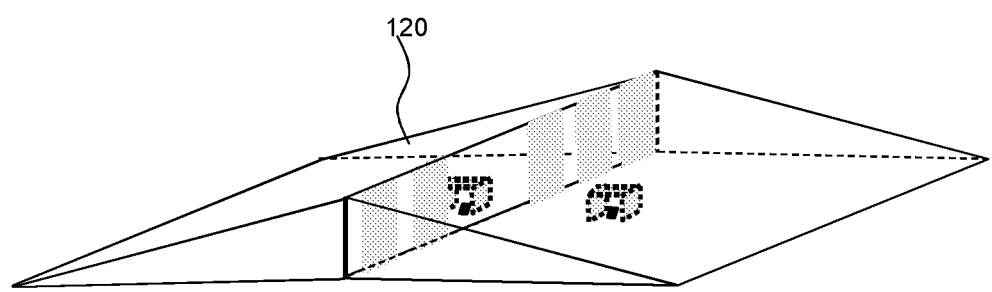
Figure 5:
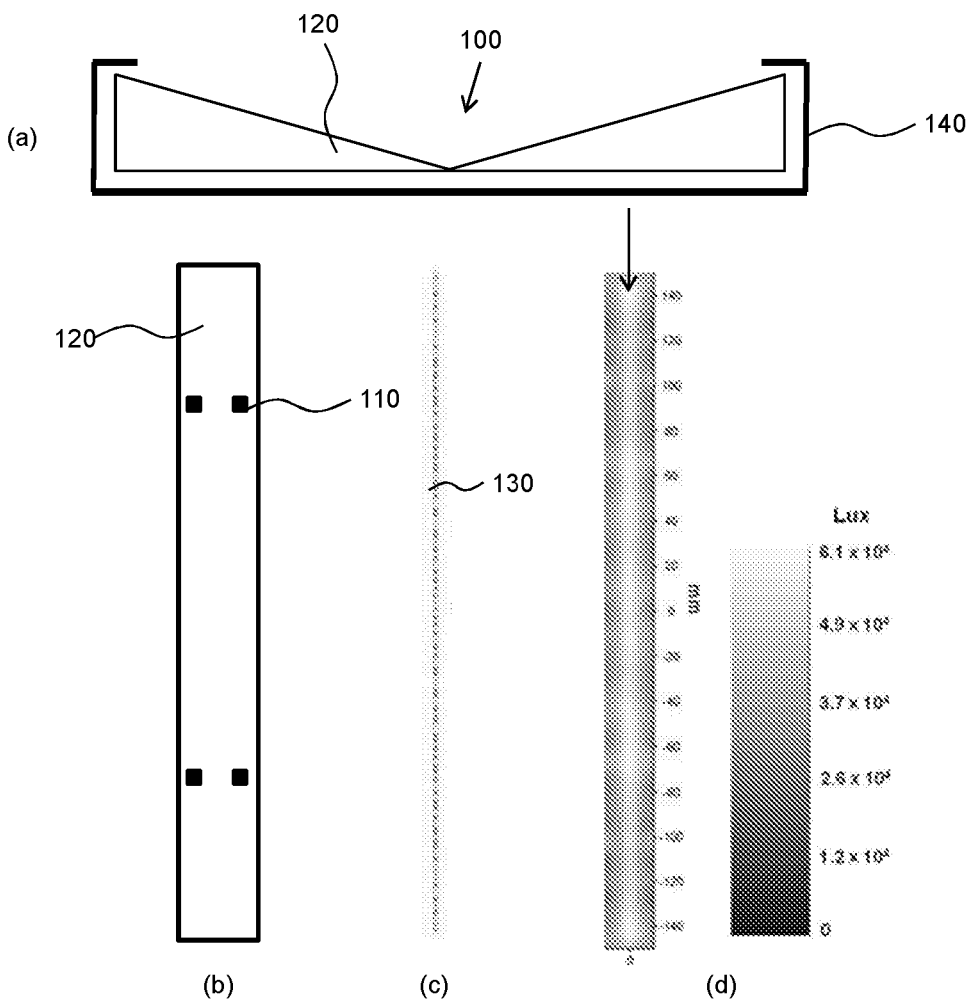
Figure 6:
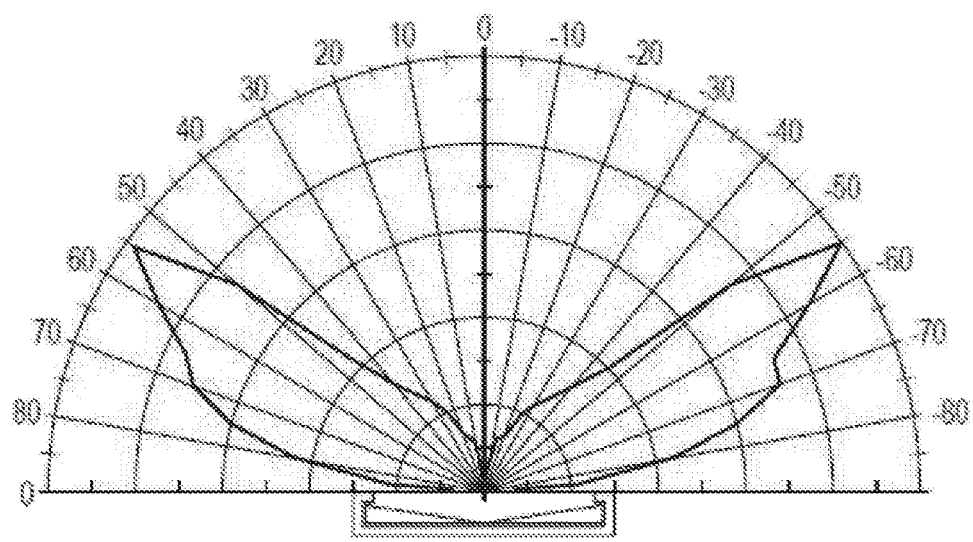
Figure 7:
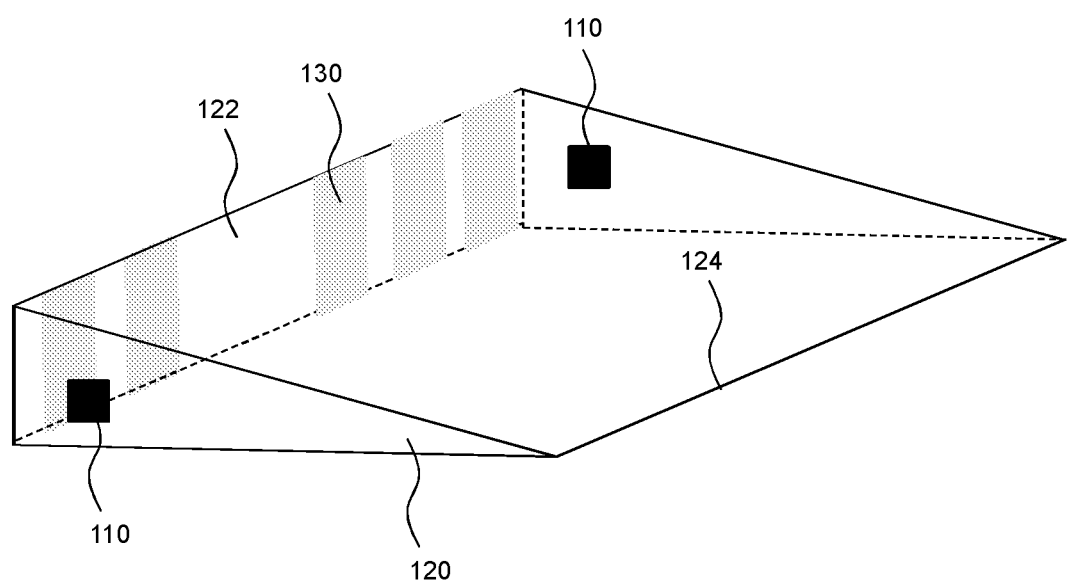
Figure 8:
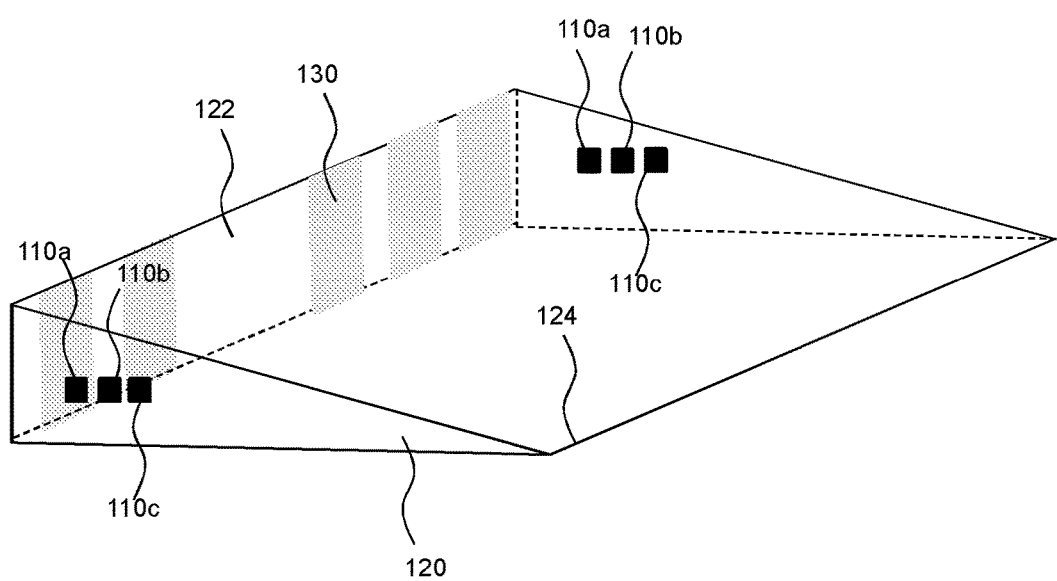
Figure 9:
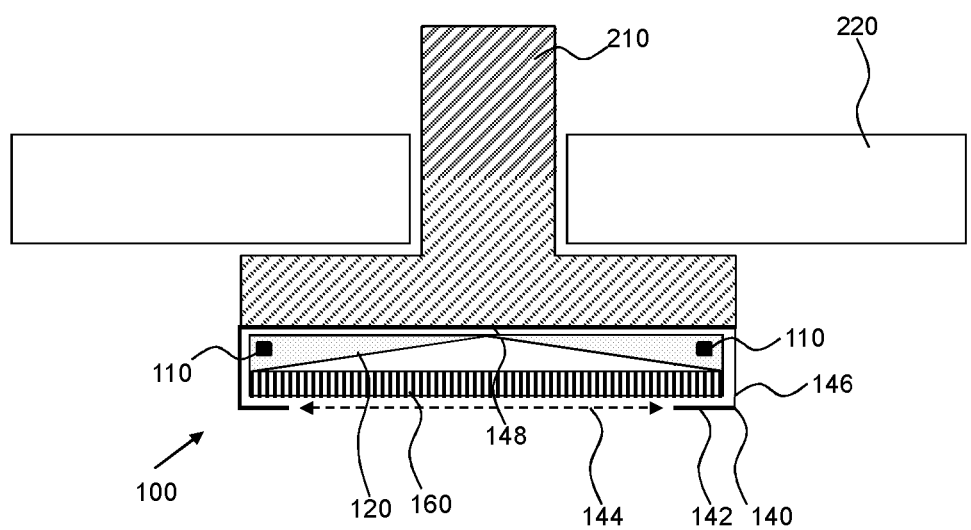
Figure 10:
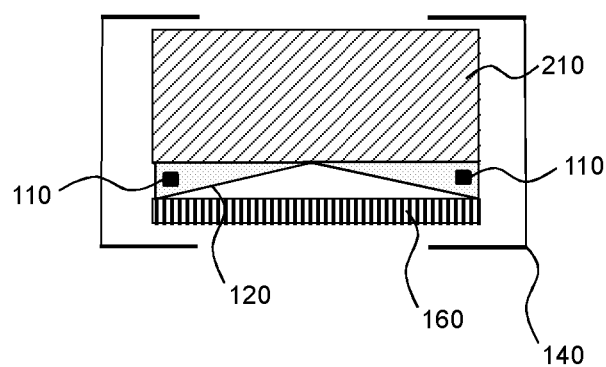
Figure 11:
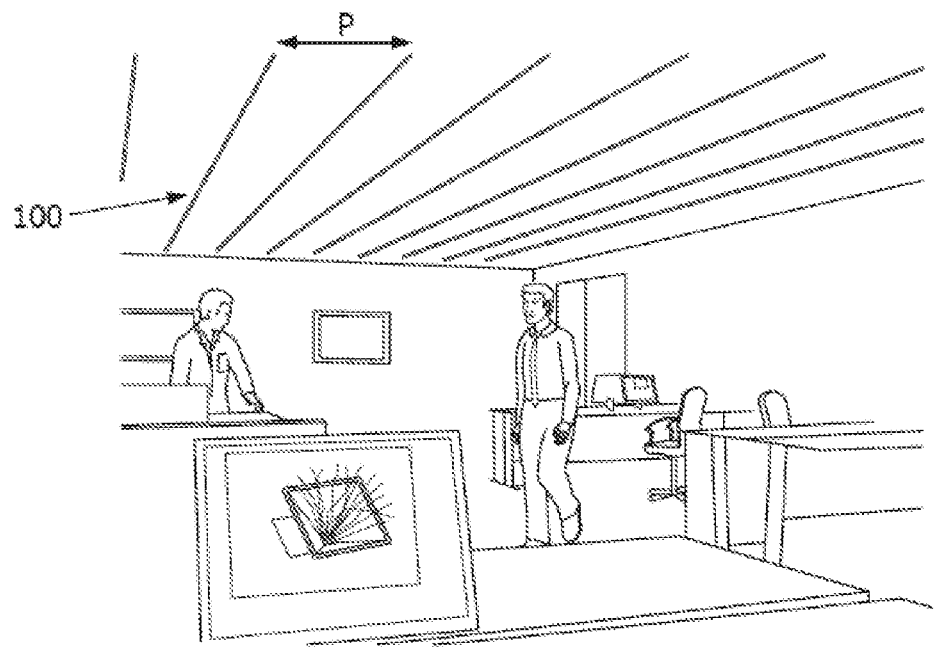
Figure 12:
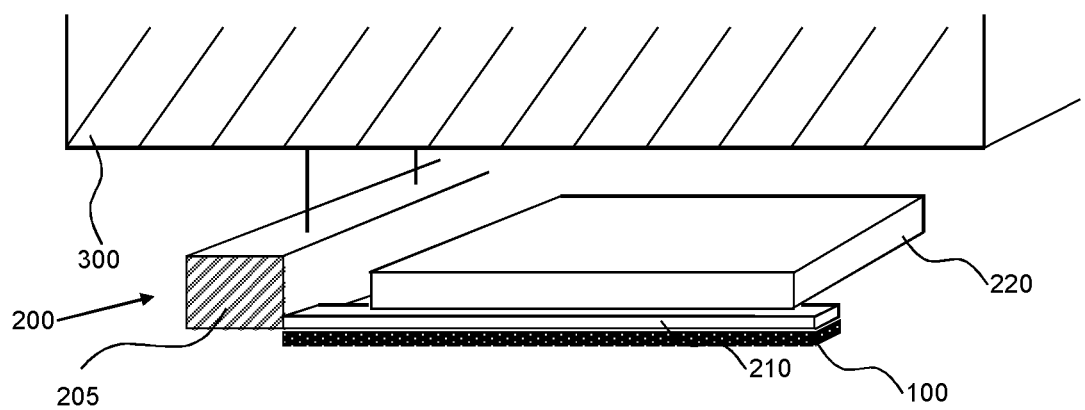

Embodiments of the invention are described in more detail and by way of non-limiting examples with reference to the accompanying drawings, wherein:

FIG. 1 schematically depicts a known optical waveguide comprising a scattering cavity;

FIG. 2 schematically depicts an optical waveguide of a lighting strip according to an embodiment of the present invention;

FIG. 3 schematically depicts an optical waveguide of a lighting strip according to another embodiment of the present invention;

FIG. 4 schematically depicts an optical waveguide of a lighting strip according to yet another embodiment of the present invention;

FIG. 5 schematically depicts a luminaire and a simulation result of the luminance of the luminaire according to an embodiment of the present invention;

FIG. 6 depicts a simulation result of the light output distribution of the luminaire of FIG. 5;

FIG. 7 schematically depicts an optical waveguide of a lighting strip according to a further embodiment of the present invention;

FIG. 8 schematically depicts an optical waveguide of a lighting strip according to a yet further embodiment of the present invention;

FIG. 9 schematically depicts a part of a modular panel system including a lighting strip according to another embodiment of the present invention;

FIG. 10 schematically depicts a part of a modular panel system including a lighting strip according to yet another embodiment of the present invention;

FIG. 11 schematically depicts a room with a modular panel system according to an embodiment of the present invention; and FIG. 12 schematically depicts a modular panel system according to an embodiment of the present invention in more detail.

DETAILED DESCRIPTION OF THE DRAWINGS

It should be understood that the Figures are merely schematic and are not drawn to scale. It should also be understood that the same reference numerals are used throughout the Figures to indicate the same or similar parts.

FIG. 1 schematically depicts a known arrangement of a planar waveguide 30 including a scattering cavity 32 in which a top-emitting LED is placed. The scattering cavity 32 has exit windows in the YZ-plane such that the light emitted by the LED inside the cavity can only exit in the X-direction, as indicated by scattering pattern 34. The bottom surface of the planar waveguide 30 typically comprises a light extraction pattern to extract the emitted light from the waveguide 30. However, in this arrangement to extracted light has a Lambertian distribution, which has a low degree of collimation such that relatively thick secondary optics such as micro-lens optical plates have to be used to generate desirable beam shapes with sufficient directionality.

In accordance with an aspect of the present invention, this problem has been addressed by the provision of a lighting strip that includes an optical waveguide having a portion with a tapered or wedge shape, such that the optical waveguide may act like a prism. A solid state lighting element is arranged in the optical waveguide to emit light through the optical waveguide in a length direction of the lighting strip. As the optical waveguide tapers in a direction perpendicular to the propagation direction of the emitted light, i.e. in a width direction of the lighting strip, the propagated light can be forced to exit the optical waveguide at the thin end of the tapering portion with a high degree of collimation, such that the waveguide can be combined with thin secondary optics to create the desired beam shapes. As the degree of tapering, e.g. the thickness of the thin edge of the wedge shaped optical wave guide, impacts on the degree of collimation of the light exiting the optical waveguide, the degree of tapering may be varied in accordance with the desired degree of collimation achieved by the lighting strip.

An embodiment of such a light guide arrangement is schematically depicted in FIG. 2. The tapered light guide 120 comprises a scattering cavity 112 in which a top-emitting solid state lighting element 110 such as a LED is placed. The scattering cavity 112 comprises two exit windows through which the light scattering inside the scattering cavity 112 can exit the scattering cavity 112 in a direction perpendicular to the tapering direction of the tapered light guide 120, as indicated by the dashed arrows in FIG. 2. Such a scattering cavity 112 may for instance be realized by forming holes of any suitable shape, e.g. rectangular holes, in the optical waveguide 120 and locating the scattering cavity 112 inside these holes. Because of its tapered or wedge shape, the optical waveguide 120 comprises a thick edge 122 and a thin edge 124. In the context of the present application, the terms thick and thin in relation to the edges 122 and 124 are merely used to indicate that the edge 122 is thicker than the edge 124, and no further inferences should be drawn from the use of these relative terms.

A scattering pattern 130 is provided on the side surface of the optical waveguide 120 to redirect light emitted by the solid state lighting element 110 to the thin edge 124 of the optical waveguide 120, such that the light is coupled out of the optical waveguide 120 in the wedge or taper direction in a collimated fashion. The thickness of the thin edge may be chosen in accordance with the desired degree of collimation as previously explained. The scattering or redirection pattern 130 may be designed such as to emulate a periodic pattern of solid state lighting alongside the optical waveguide 120 as for instance is disclosed in WO 2012/131636, to ensure a homogeneous light output from the optical waveguide 120. The definition of such suitable redirection patterns is well-known per se and will not be explained in further detail for the sake of brevity. Such a scattering pattern 130 may be realized in any suitable manner. Particularly preferred is a pattern of highly scattering paint dots as such paint dots can be easily applied in any suitable pattern.

In FIG. 2, the optical waveguide 120 comprises a single tapered portion. It should be understood that this is by way of non-limiting example only. For instance, an optical waveguide 120 may be provided comprising a pair of such tapered portions, as shown in FIGS. 3 and 4 respectively. In FIG. 3, the thin edges 124 of the respective tapered portions face each other, in which case light having a high degree of collimation is emitted predominantly from the centre of the optical waveguide 120. This also has the advantage that opposing solid state lighting elements 110 are relatively far removed from each other, which simplifies the thermal management of the lighting strip 100 at the expense of a relatively large PCB.

In FIG. 4, the thick edges 122 of the respective tapered portions face each other, in which case the light is emitted predominantly from the edges of the optical waveguide 120. Although the light emitted from this lighting strip 100 is typically less collimated than the light from the lighting strip in FIG. 3, this embodiment has the advantage that the solid state lighting elements 110 may be placed in close vicinity to each other near the central portion of the lighting strip 100, thus reducing the required area of the PCB on which the solid state lighting elements 100 are mounted, which reduces the cost of the lighting strip 100. In addition, the placement of the thin edges of the optical waveguide 120 facilitates a thinner lighting strip 100, which may be aesthetically more pleasing in some applications.

Where such a double wedge design is used, it may be advantageous to include a reflective element such as a specular reflector in the design of the lighting strip such that the reflective element is located over the unexposed surface of the optical waveguide 120, i.e. the non-tapering surface extending from the thick edge 122 to the thin edge 124 of the optical waveguide 120, which promotes the beam emitting from the optical waveguide 120 in a direction perpendicular to the plane of the optical waveguide 120 and reduces the losses of light through surfaces of the optical waveguide 120 unintended to emit light. The lighting strip 100 may further comprise a redirection foil over its emissive surface to redirect the emitted light if required. Such redirection foils are known per se such that this will not be explained in further detail for the sake of brevity only.

FIG. 5 schematically depicts a luminaire or lighting strip 100 including a waveguide arrangement as shown in FIG. 3. FIG. 5(a) gives a side view including a reflective housing 140 for the optical waveguide 120, FIG. 5(b) gives a top view in which the distribution of the solid state lighting elements 110 in the optical waveguide 120 is shown, from which the reflective housing 140 has been omitted for the sake of clarity, FIG. 5(c) depicts the scattering paint pattern 130 that is applied on the thick edges 122 of the wedge portions of the optical waveguide 120 and FIG. 5(d) depicts the calculated luminance of the luminaire 100, from which it is evident that a highly collimated, intense and homogeneous output can be achieved as indicated by the arrow.

It is noted at this point that the efficiency of an optical waveguide 120 including one or more tapered portions is correlated to the height of the thick edge 122 of such a tapered portion. Increased thickness improves the efficiency of the optical waveguide 120. In FIG. 5, a thickness of 2 mm was chosen, which was estimated to have an efficiency of around 70%.

The directionality of the output beam of the lighting strip 100 of FIG. 5 is shown in more detail in FIG. 6. As can be seen in FIG. 6, a highly direction output beam can be created by combining a tapered optical waveguide 120 with solid state lighting elements 110 that are arranged to generate light in a length direction of the optical waveguide 120 and therefore in a length direction of the luminaire 100. It is noted for the sake of completeness that the direction in which the optical waveguide 120 typically corresponds to the width direction of the luminaire 100.

At this point, it is noted that a luminaire or lighting strip 100 according to the present invention may also be realized without scattering cavities. FIGS. 7 and 8 show examples of such alternative embodiments. In FIG. 7, a white light producing solid state element 110 is placed at opposite ends of a tapered optical waveguide 120 such that the optical waveguide 120 separates the white light producing solid state element 110 in its length direction. It should be understood that although FIG. 7 depicts an embodiment in which two white light producing solid state elements 110 are shown, one of the white light producing solid state elements 110 may be omitted without departing from the teachings of the present invention.

Instead of a white light producing solid state element 110, a group of solid state elements 110a-c producing different colours may be used as shown in FIG. 8, The different colours may be combined to produce white light, e.g. a red light producing solid state lighting element 110a, a green light producing solid state lighting element 110b and a blue light producing solid state lighting element 110c. Alternatively, the different colours may be combined to produce coloured, i.e. non-white light. Different colour combinations using different numbers of solid state lighting elements are of course equally feasible.

Also, although FIG. 8 depicts two groups of solid state elements 110a-c producing different colours at opposite ends in the length direction of the lighting strip 100, one of the groups may be omitted without departing from the teachings of the present invention.

In addition, it should be understood that although FIGS. 7 and 8 depict embodiments in which the optical waveguide 120 comprises a single tapered portion, it is of course equally feasible to provide optical waveguides containing pairs of tapered portions such as shown in FIGS. 3 and 4, in which the solid lighting elements 110 in scattering cavities 112 are replaced by the white light or colour producing solid state lighting elements as shown in FIGS. 7 and 8.

FIG. 9 shows an embodiment of a lighting strip 100, which is particularly suited for retrofitting purposes. The lighting strip 100 is fitted to the bottom surface of e.g. a shelf or cupboard or alternatively to an exposed surface of a panel support element 210 of a modular panel system such as a suspended ceiling. The panel support element 210 is T-shaped by way of non-limiting example only. The lighting strip 100 comprises a housing 140 including a bottom surface 142 including a light exit window 144, a top surface 148 facing the T-shaped panel support element 210 and side surfaces 156 extending from the bottom surface 152 to the top surface 158 in a length direction of the housing 150. A secondary optical element 160, e.g. a redirection foil, a beam shaping element or a glare reducing element may be fitted, e.g. fixated over the light exit window 144, with the optical waveguide 120 being located in between the top surface 158 and the secondary optical element 160. Solid state lighting elements 110 are arranged in the optical waveguide 120 such that they emit light in the length direction of the lighting strip 100, as previously explained.

The material of the housing 140 may be flexible, e.g. made of a plastics material. The housing 140 may be reflective on the inside to maximize the light output of the lighting strip 100. Any suitable reflective material may be used. The material of the housing 140 may be reflective or the inner surfaces of the housing 150 may be coated with a reflective material. In addition, a reflective layer may be present between the upper surface 148 of the housing 140 and the optical waveguide 120.

The outer surface of the upper surface 148 may contain an adhesive for fixing the lighting strip 100 to a receiving surface such as the bottom surface of a shelf or cupboard or alternatively the surface of a panel support element 210 of a modular panel system 200. Alternatively, the lighting strip 100 may be clamped to the receiving surface using suitable clamps. Alternative fixation means will be apparent to the skilled person. Although the embodiment of the lighting strip 100 in FIG. 9 is shown separate to the panel support element 210, it should be understood that it is equally feasible to integrate this embodiment into a panel support element 210.

FIG. 10 shows another example embodiment of the lighting strip 100, in which the housing 140 forms a cladding around the support element 210 of a modular panel system 200. This embodiment is also particularly suitable for retrofitting purposes. Alternatively, such a lighting strip 100 may be fitted to a panel support element 210 during its assembly.

FIG. 11 shows a simulation of the appearance of a room fitted with a modular panel system, here a suspended ceiling, comprising lighting strips or luminaires 100. The modular panel system may have primary support beams, e.g. band rasters, which run perpendicularly to the luminaires 100, with support elements extending between adjacent primary support beams being extended with the luminaires 100. Simulations have demonstrated that for a lighting strip 100 having a width of 24 mm and a length of 60 cm in a ceiling having lines of panel support elements 210 at a pitch P of 60 cm, a luminance of 500 lux can be achieved at the working surfaces in the room by having each lighting strip 100 having a luminous output of 230 lumen, i.e. 380 lumen/m of the strips 100.

As shown in FIG. 12, which depicts a non-limiting example of a modular panel system 200, the primary support beams 205 of the modular panel system 200 are suspended from the ceiling 300 of a room, with the panel support elements 210 carrying the panels or tiles 220 extending between primary support beams 205. The luminaire 100 is fitted to the panel support elements 210, for instance by integration into the panel support elements 210 or by attachment thereto, as previously explained. As the panel support elements 210 can be easily removed from the modular panel system 200 without dismantling the whole system, e.g. removing it from the ceiling 300, it is straightforward and cost-effective to retrofit the luminaire 100 into the modular panel system 200, either by replacing a prior art panel support element 210 with a panel support element 210 of the present invention, or by attaching the luminaire 210 to an existing panel support element 210. It is of course also feasible to integrate a luminaire 100 of the present invention into a primary support beam 205 or retrofit it thereto, although this is likely to be less straightforward and not as cost-effective as the (retro-)fitting to panel support elements 210. It is reiterated that for a modular panel system 200 in accordance with the present invention, it is preferred that the ratio of the width W of the exit window the lighting strips 100 and the pitch P of the panel support elements 210 is chosen in the range 0.02-0.08, and W/P preferably is 0.04 for the reasons already explained above.

It is further noted that a lighting strip 100 according to at least some of the embodiments of the present invention can be manufactured in a low-cost manner, e.g. using extrusion or roll-to-roll techniques due to the fact that the optical elements in the lighting strip 100 are symmetrical in the length direction of the strip. The electronics in the lighting strip 100 of the present invention may further be designed such that the lighting strip 100 can be easily cut at any length without losing uniformity.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting strip, comprising:
  an optical waveguide including a thick edge extending in a length direction of the optical waveguide and having a tapered portion tapering between a thin edge and the thick edge along a width direction of the optical waveguide, the width direction being perpendicular to the length direction;
  at least one solid state lighting element arranged within the optical waveguide and arranged to emit light into the optical waveguide in the length direction alongside the thick edge; and
  a light scattering pattern on the thick edge of the tapered portion for redirecting the emitted light to the thin edge of the tapered portion.

2. The lighting strip of claim 1, further comprising a plurality of recesses, each comprising a scattering cavity having opposite exit surfaces in the length direction, wherein each solid state lighting element is placed inside one of the scattering cavities.

3. The lighting strip of claim 2, wherein each solid state lighting element is arranged to emit light towards the scattering cavity in a direction perpendicular to the width direction and the length direction.

4. The lighting strip of claim 1, wherein the at least one solid state lighting element comprises a white light solid state lighting element at an end of the optical waveguide in the length direction.

5. The lighting strip of claim 4, wherein the at least one solid state lighting element comprises a pair of white light solid state lighting elements at opposite ends of the optical waveguide in the length direction.

6. The lighting strip of claim 5, further comprising a reflective element covering at least a part of the optical waveguide.

7. The lighting strip of claim 1, wherein the at least one solid state lighting element comprises a first group of solid state lighting elements at an end of the optical waveguide in the length direction, and wherein the first group comprises solid state lighting elements for emitting light of different colours.

8. The lighting strip of claim 7, wherein the at least one solid state lighting element comprises a first group and a second group of solid state lighting elements at opposite ends of the optical waveguide in the length direction, and wherein each of the first and second groups comprise solid state lighting elements for emitting light of different colours.

9. The lighting strip of claim 8, wherein the optical waveguide comprises a pair of the tapered portions arranged such that the thin edges of the pair face each other.

10. The lighting strip of claim 8, wherein the optical waveguide comprises a pair of the tapered portions arranged such that the thick edges of the pair face each other.

11. The lighting strip of claim 1, wherein the light scattering pattern comprises a pattern of paint dots.

12. A lighting system including at least one lighting s as claimed in claim 1.

13. The lighting system of claim 12, wherein the lighting system comprises a plurality of the lighting strips, and wherein the lighting system further comprises a controller for setting the light output of individual lighting strips as a function of at least one of incident daylight, room layout and room occupancy.

14. A panel support element for a modular panel system comprising a lighting strip as claimed in claim 1.

15. A modular panel system, comprising:
  a support grid comprising support members for attaching to a building structure and panel support elements for extending between support members; and
  a plurality of panels dimensioned to be supported by the support grid;
  wherein the support grid comprises a plurality of lighting strips as claimed in claim 1.

* * * * *